US011125014B2

(12) United States Patent
Parks

(10) Patent No.: US 11,125,014 B2
(45) Date of Patent: Sep. 21, 2021

(54) METHODS OF USE OF HANGER ASSEMBLIES FOR A LADDER

(71) Applicant: Chad Alan Parks, Choctaw, OK (US)

(72) Inventor: Chad Alan Parks, Choctaw, OK (US)

( * ) Notice: Subject to any disclaimer, the term of this patent is extended or adjusted under 35 U.S.C. 154(b) by 0 days.

(21) Appl. No.: 17/035,146

(22) Filed: Sep. 28, 2020

(65) Prior Publication Data

US 2021/0246726 A1 Aug. 12, 2021

Related U.S. Application Data

(62) Division of application No. 16/881,183, filed on May 22, 2020, now Pat. No. 10,822,876.

(60) Provisional application No. 62/972,030, filed on Feb. 9, 2020.

(51) Int. Cl.

| | |
|---|---|
| ***F16M 11/00*** | (2006.01) |
| ***E06C 7/14*** | (2006.01) |
| ***E06C 1/16*** | (2006.01) |
| ***B25B 5/04*** | (2006.01) |

(52) U.S. Cl.

CPC .................. *E06C 7/14* (2013.01); *B25B 5/04* (2013.01); *E06C 1/16* (2013.01)

(58) Field of Classification Search

CPC .... E06C 7/14; E06C 1/16; B25B 5/04; F16M 13/02; F16M 13/00; F21S 8/043

See application file for complete search history.

(56) References Cited

U.S. PATENT DOCUMENTS

| | | | |
|---|---|---|---|
| 4,182,431 A | 1/1980 | Wing | |
| 4,850,254 A | 7/1989 | Burney | |
| 7,364,017 B2 | 4/2008 | Moss et al. | |
| 8,186,481 B2 | 5/2012 | Moss et al. | |
| 8,365,865 B2 | 2/2013 | Moss et al. | |
| 8,997,930 B2 | 4/2015 | Moss et al. | |
| 9,663,989 B2 | 5/2017 | Moss et al. | |
| 10,487,578 B2 | 11/2019 | Smith et al. | |
| 2005/0061118 A1 | 3/2005 | Heacock | |
| 2016/0024845 A1* | 1/2016 | Coe .......................... | E06C 7/14 220/737 |

* cited by examiner

*Primary Examiner* — Amy J. Sterling

(74) *Attorney, Agent, or Firm* — Dunlap Codding, P.C.

(57) ABSTRACT

Ladder hanger systems and methods are disclosed, including a hanger assembly engaged with a ladder, the hanger assembly comprising: a plate having a longitudinal axis, a front having a textured surface, and a back; a first track and a second track connected to the back of the plate, the first track substantially aligned with the second track along the longitudinal axis, the first track spaced longitudinally from the second track; a first clamp moveably engaged with the first track, a second clamp moveably engaged with the second track; and mounting hooks connected to the plate between the first track and the second track, the mounting hooks forming a receiving space for a rung of a ladder, engaged with the first rung, and positioned between a pair of spaced apart rails of a side rail assembly.

13 Claims, 11 Drawing Sheets

METHODS OF USE OF HANGER ASSEMBLIES FOR A LADDER

CROSS-REFERENCE TO RELATED APPLICATIONS

The present patent application claims priority to the U.S. patent application identified by Ser. No. 16/881,183, filed on May 22, 2020, entitled "SYSTEMS AND METHODS OF USE OF HANGER ASSEMBLIES FOR A LADDER," which claims priority to the provisional patent application identified by U.S. Ser. No. 62/972,030, filed on Feb. 9, 2020, entitled "Ladder Suspended Attachment Device," the entire content of each of which is hereby incorporated herein by reference.

FIELD OF THE DISCLOSURE

The disclosure generally relates to methods and apparatuses for suspending an object using a ladder to support the object. More particularly the disclosure relates to attaching a rug or floor mat to a hanger assembly attachable to an upright ladder. The hanger assembly may be used to suspend the rug or floor mat on the ladder in order to clean and disinfect the rug or floor mat, such as with a pressurized fluid or applicable disinfectants.

BACKGROUND

Doormats are generally placed immediately outside or inside an entrance to a home or business which allows people to wipe their shoes on the mat before entering the building. However, doormats can quickly become covered with ground-in dirt and bacteria. Area rugs are often used in the home or office to add to the decor while also providing other benefits, such as protecting the floor, noise reduction, and adding comfort and warmth. Even though an area rug may be used on the interior of a building, they require regular cleanings to extend the life and beauty of the rug and remove harmful germs and bacteria.

There are many other types of floor mats in use today that can be found anywhere people work and live. Car mats are designed to protect a vehicle's carpeted floors by collected dirt, salt, sand, and other grime from destroying the vehicle's carpet. Anti-slip mats are used in kitchens or other locations where a smooth floor may cause someone to fall and become injured. Anti-fatigue mats are located in many offices and factories where workers may be required to be on their feet for prolong periods of time. Similar to the door mats and the area rugs, these types of mats experience foot travel that require the mats to be properly cleaned on a regular basis.

The current methods and techniques for cleaning rugs and other floor mats are inefficient, damaging to the cleaning equipment, and potentially harmful to the person cleaning the rug. For many years, people have attempted to clean their rugs by holding the rug in one arm while repeatedly striking the rug with a carpet rod or rattan rug beater. This method is not only physically exhausting for the person who is holding the heavy rug in the air while swinging a carpet rod, but it also exposes the person to harmful dust and allergens being released into the air with each strike.

One of the more common methods of cleaning rugs/mats is with the use of a vacuum cleaner. The vacuum cleaner creates a suction effect that is intended to lift dust, dirt, and debris off a rug/mat and collect the dirt in a canister or vacuum bag that requires disposal. The majority of the inexpensive vacuum cleaners only provide enough power to remove surface dust, dirt, and debris and are ineffective at removing any type of stain. Even expensive industrial-grade vacuum cleaners are incapable of removing all the dirt trapped in the deeper parts of the rug.

If the rug is small enough, the rug may be put into a traditional home washing machine in an effort to clean the rug. However, attempting to clean a rug in the washing machine can have serious negative consequences for both the machine and the rug. The viscous gravel and abrasive debris can be dislodged from the rug/mat which can harm washing machine seals and scratch sealed surfaces. The washing machine can damage or potentially destroy the rug during the machine's wash cycle.

Without a proper device for suspending a dirty rug off the ground, some rugs/mats are laid on the ground in a horizontal position and sprayed with water or cleaning fluid. Unfortunately, there is nowhere for the fluid to flow with the rug arranged in this position and the dirt/debris merely gets moved around the rug. Worse yet, the water-logged rug may become difficult to move after it has been sprayed and is often left in place to dry against the ground leading to mold and mildew buildup within and underneath the rug.

There exists a need for an improved apparatus for cleaning objects such as rugs and floor mats efficiently and effectively. It is to such apparatus that the inventive concepts disclosed herein are directed.

SUMMARY

Ladder hanger systems and methods are disclosed. The problem of positioning an object, such as a rug, to allow the object to be adequately cleaned is addressed through a hanger assembly configured to receive and suspend the object on a ladder.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
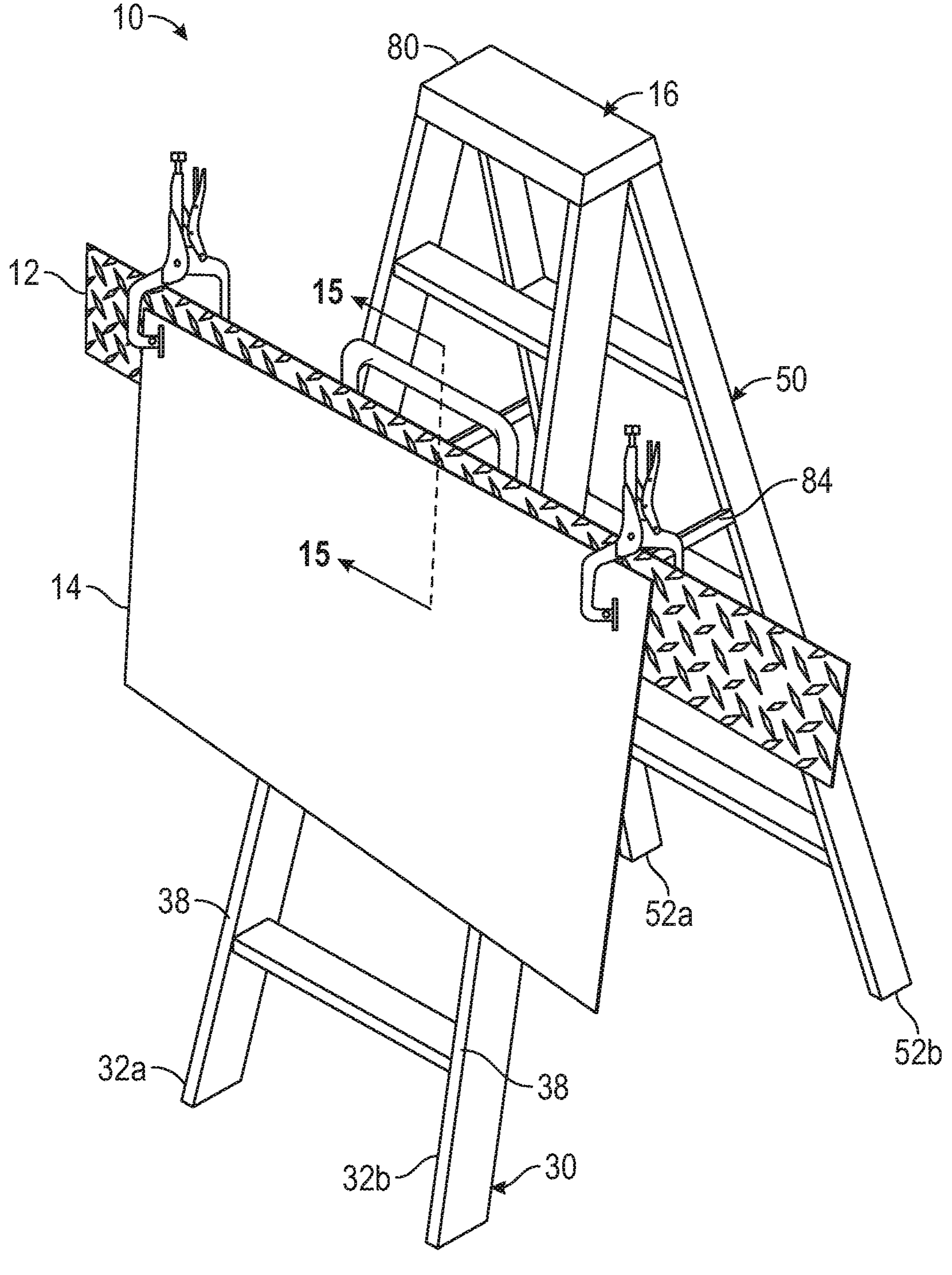
FIG. 1 is a perspective view of exemplary ladder hanger system in accordance with the present disclosure.
Figure 2:
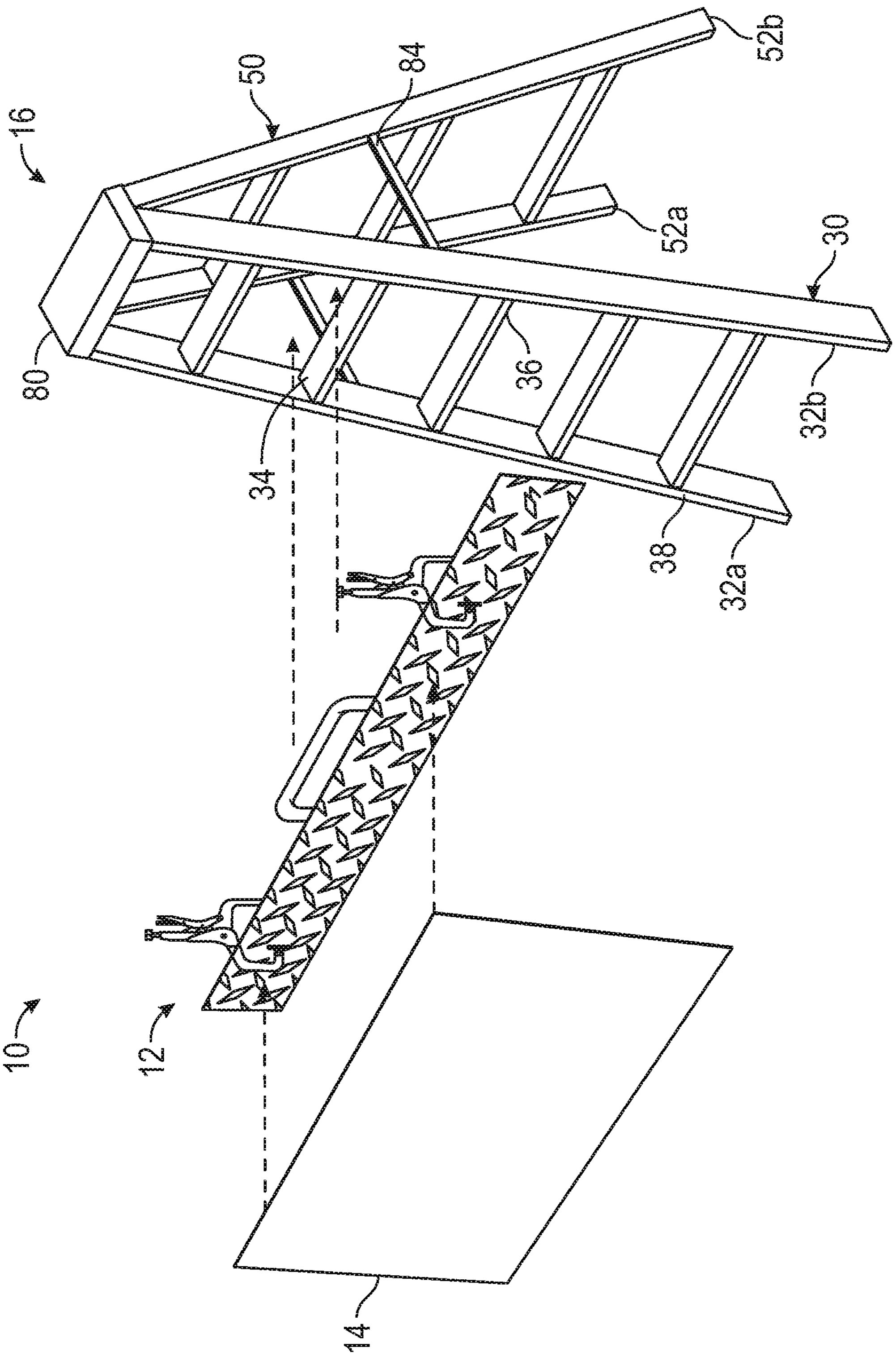
FIG. 2 is a perspective view of components of the ladder hanger system of FIG.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIGS. 1-5, exemplary ladder hanger systems 10, 10*a* are illustrated. The ladder hanger systems 10, 10*a* may comprise a hanger assembly 12 and a ladder 16, 16*a*. The hanger assembly 12 is attachable to the ladder 16, 16*a* and configured to suspend an object 14, such as a rug or floor mat. It will be understood that while the object 14 may be described as a rug in examples herein, the object 14 may include any item capable of being attached to the hanger assembly 12, such as, but not limited to, mats, shoes, butcher paper, artwork, blueprints, and schematics, for example.

Nonexclusive examples of the ladder 16, 16*a* include step ladders, extension ladders, orchard ladders, Christmas tree ladders, and combinations thereof. In one embodiment, the ladder 16 may comprise a first side rail assembly 30 having a pair of first spaced apart rails 32*a*-32*b*, a first rung 34, and a second rung 36. The first rung 34 and the second rung 36 may extend between and/or across the first spaced apart rails 32*a*-32*b*, attaching to the first spaced apart rails 32*a*-32*b*, and connecting the first spaced apart rails 32*a*-32*b* to one another. The first rung 34 and second rung 36 each has a top 35 and a bottom 37. In one embodiment, the first rung 34 and the second rung 36 may be substantially perpendicular to the first spaced apart rails 32*a*-32*b*. In one embodiment, each of the first spaced apart rails 32*a*-32*b* has a front surface 38, and the first rung 34 and the second rung 36 are coupled to the front surfaces 38. The first rung 34 has a length and a diameter or width. The second rung 36 has a length and a diameter or width.

Figure 5:
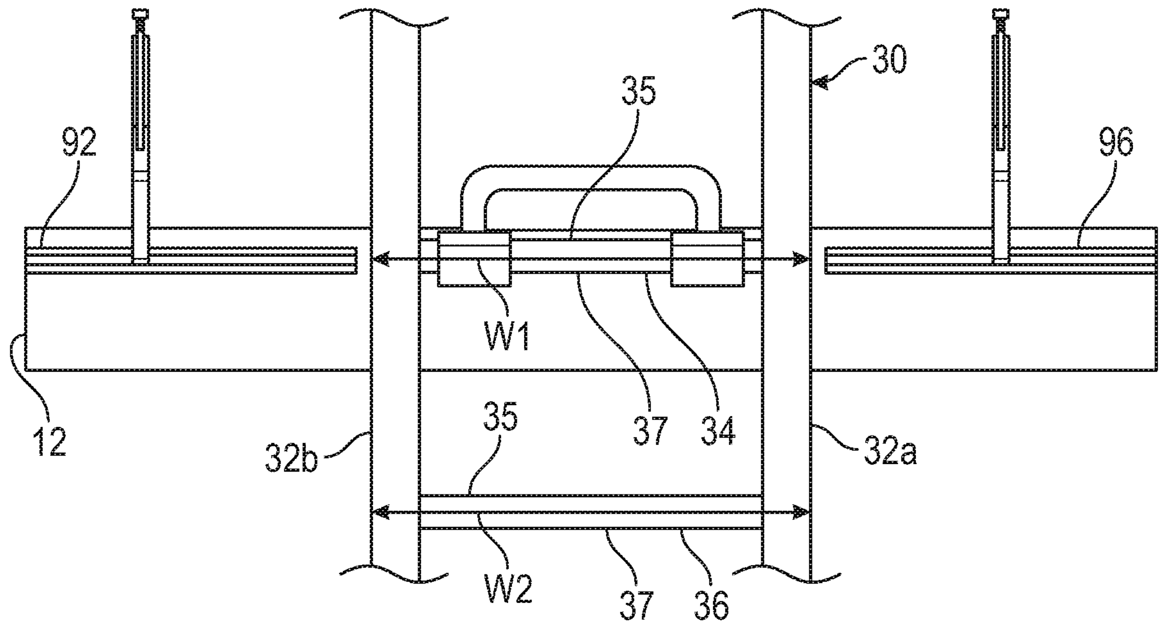
FIG. 5 is a partial back view of an exemplary rail assembly and hanger assembly of FIG. 2 in accordance with the present disclosure.

As shown in FIG. 5, the first side rail assembly 30 has a first width W1 at a first location where the first rung 34 is attached to the first spaced apart rails 32*a*-32*b* and a second width W2 at a second location where the second rung 36 is attached to the first spaced apart rails 32*a*-32*b*. In one embodiment, the first width W1 is substantially the same as the second width W2. In one embodiment, the second width W2 is greater than the first width W1. In one embodiment, the length of the first rung 34 is substantially same as the first width W1 of the first side rail assembly 30. In one embodiment, the length of the second rung 36 is substantially same as the second width W2 of the first side rail assembly 30.

In one embodiment, the ladder 16 may further comprise a second side rail assembly 50. The second side rail assembly 50 may comprise a pair of second spaced apart rails 52*a*-52*b* and one or more rung 54 that extend across and/or are coupled to the second spaced apart rails 52*a*-52*b*. Each of the one or more rung 54 has a top 56 and a bottom 58.

Figure 3:
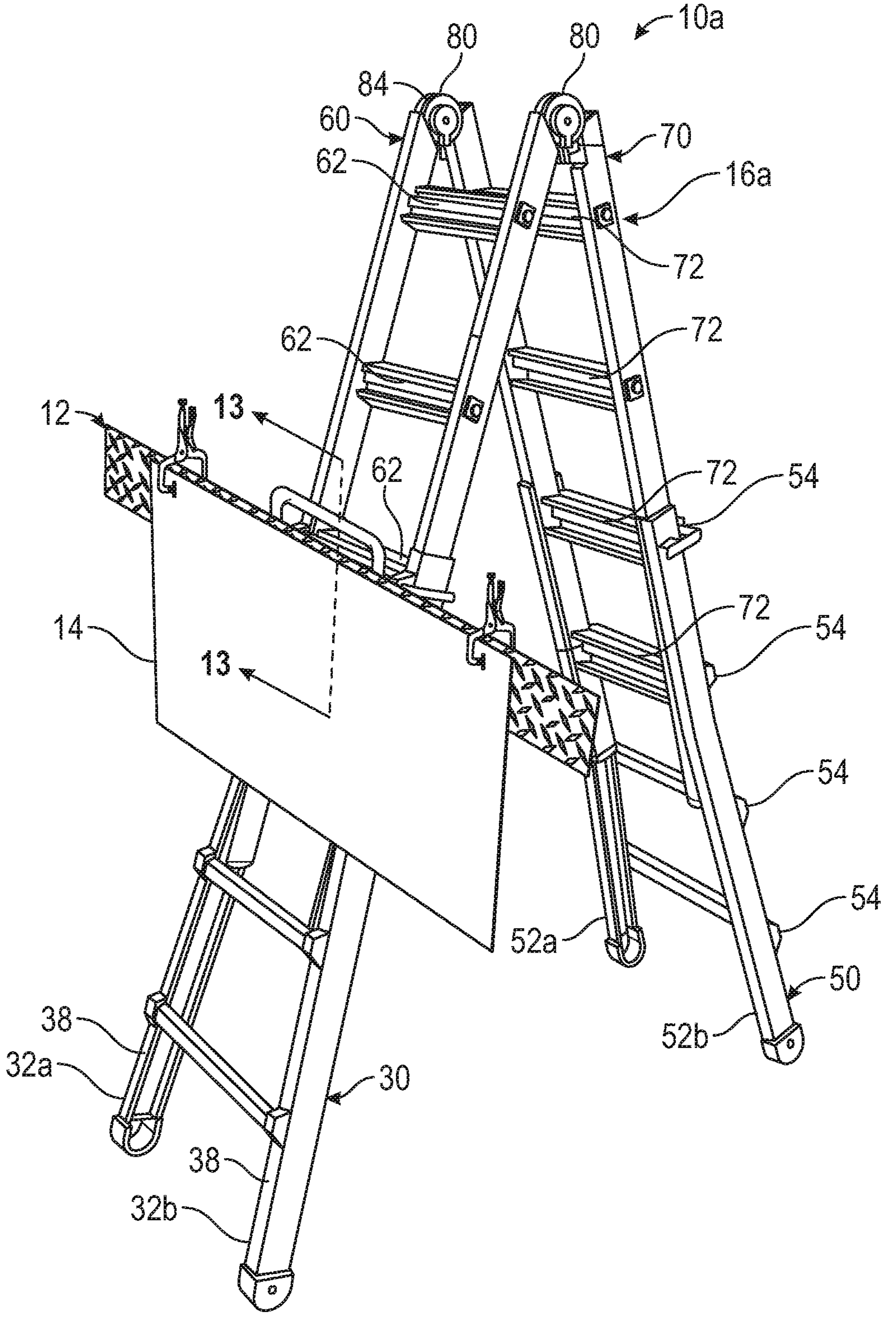
FIG. 3 is a perspective view of another exemplary ladder hanger system in accordance with the present disclosure.
Figure 4:
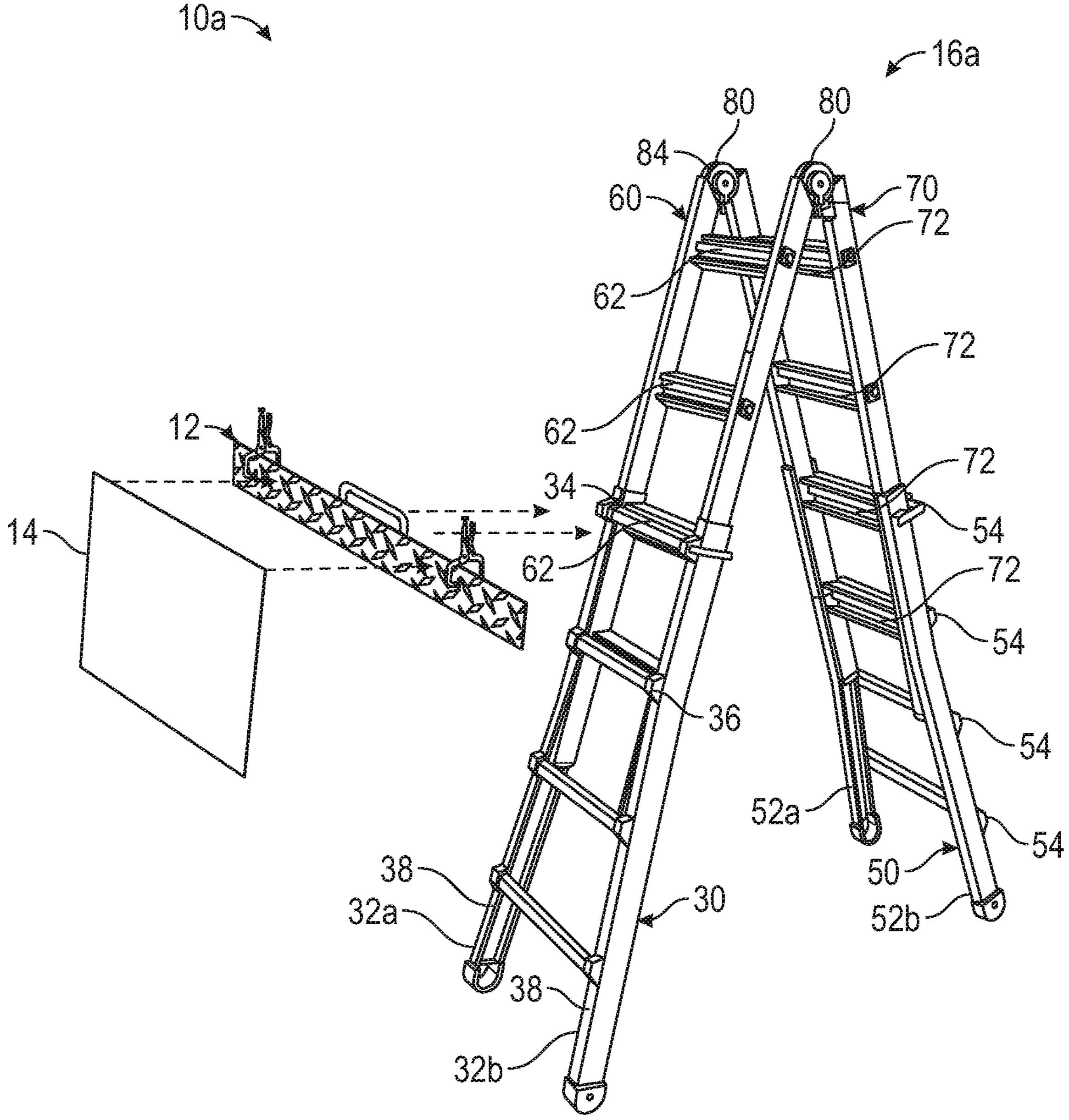
FIG. 4 is a perspective view of components of the ladder hanger system of FIG. 3.

FIGS. 3 and 4 illustrate the ladder hanger system 10*a*, which is the same as the ladder hanger system 10, but comprises the ladder 16*a* rather than the ladder 16. The ladder 16*a* may comprise the components described of the ladder 16 but may further comprise a third side rail assembly 60 and a fourth side rail assembly 70 mounted in a telescopic relation within the first side rail assembly 30 and second side rail assembly 50, respectively. The third side rail assembly 60 may include one or more rungs 62 that align with and are offset from the first rung 34 and second rung 36 of the first side rail assembly 30. The fourth side rail assembly 70 may include one or more rungs 72 that align with and are offset from the rung 54 of the second side rail assembly 50. The ladder **16*a*** may be a combination extension-and-step ladder. Combination extension-and-step ladders are well known in the art and thus will not be described in further detail herein. For example, an exemplary combination extension-and-step ladder with a plurality of rungs is described in U.S. Pat. No. 4,182,432, "Combination Extension and Step Ladder Rungs Therefor," issued Jan. 8, 1980, which is hereby incorporated herein by reference in its entirety.

In one embodiment, the ladder 16, **16*a* may include one or more hinge 80. The one or more hinge 80 may rotatably connect the first side rail assembly 30 to the second side rail assembly 50. In one embodiment, the one or more hinge 80 may rotatably connect the third side rail assembly 60 to the fourth side rail assembly 70. The one or more hinge 80 may be configured to allow the first side rail assembly 30 to be rotated relative to the second side rail assembly 50, such as from a folded position to an extended position. In one embodiment, the ladder 16, 16*a* may include a locking mechanism 84 to lock the ladder 16 in a plurality of fixed positions, such that the first side rail assembly 30 is unable to be rotated relative to the second side rail assembly 50. In one embodiment, in use with the ladder hanger system 10, the ladder 16, 16*a* may be locked into a standing configuration having an acute angle between the first side rail assembly 30 and the second side rail assembly 50**.

In one embodiment, the ladder 16, **16*a* may be constructed of metal, such as aluminum. The ladder 16, 16*a* may be constructed of one or more other lightweight, corrosion resistant, strong, and durable materials. The ladder 16, 16*a* may be constructed of any suitable material, or combination of materials, capable of supporting the hanger assembly 12, such as, steel, fiberglass, wood, and plastic. The ladder 16, 16*a* may have a corrosion resistant coating applied to reduce the likelihood of corrosion and extend the life of the ladder 16, 16*a***.

Figure 6:
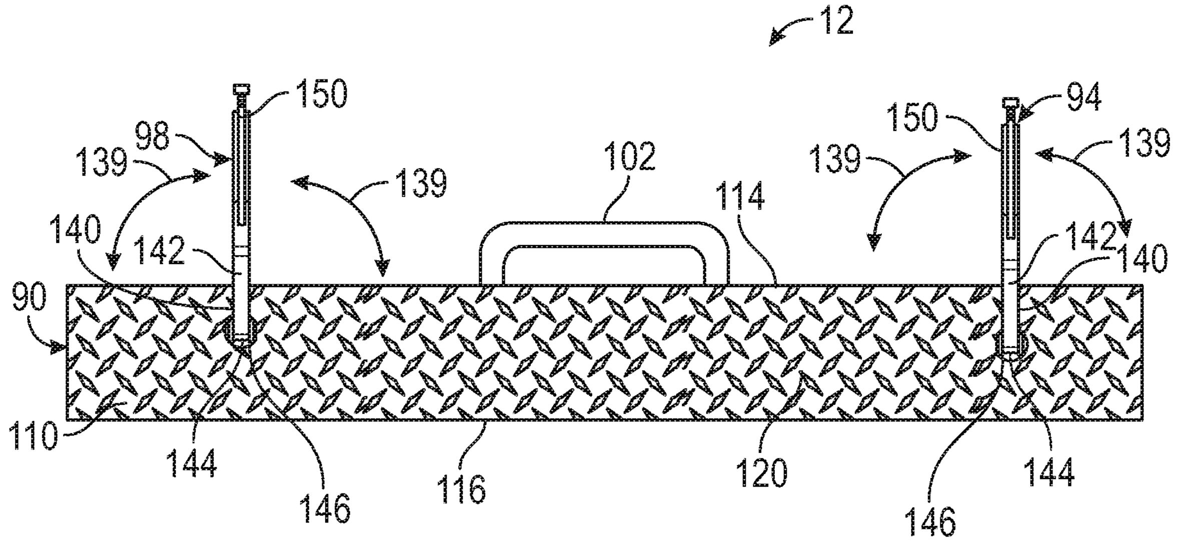
FIG. 6 is a front view of an exemplary hanger assembly in accordance with the present disclosure.
Figure 7:
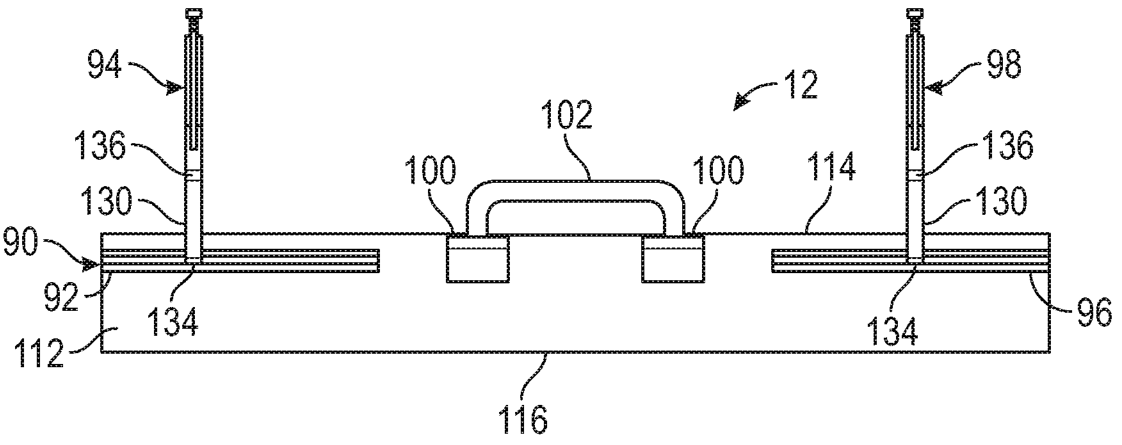
FIG. 7 is a back view of the exemplary hanger assembly of FIG. 6 in accordance with the present disclosure.
Figure 8:
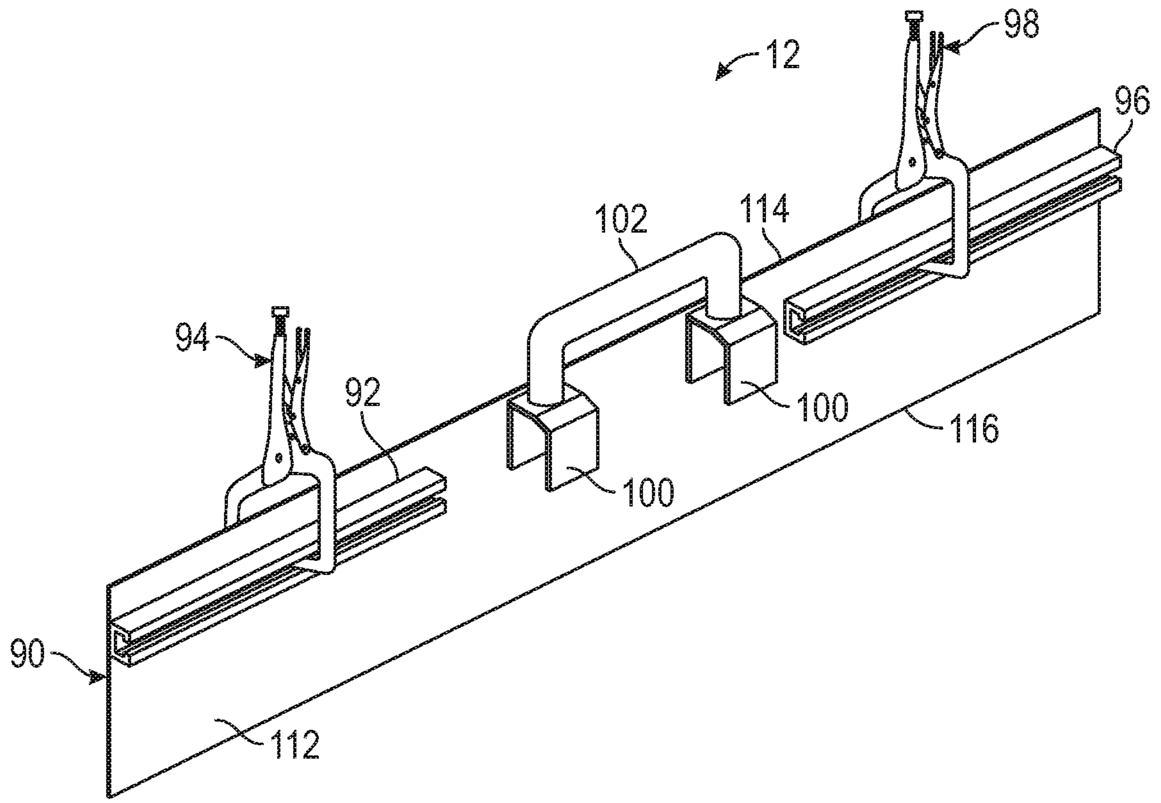
FIG. 8 is a back, perspective view of the exemplary hanger assembly of FIG. 6 in accordance with the present disclosure.

As shown in FIGS. 6-8, in one embodiment the hanger assembly 12 may comprise a plate 90, a first track 92, a first clamp 94, a second track 96, a second clamp 98, and one or more mounting hook 100. In one embodiment, the hanger assembly 12 may comprise a handle 102.

The plate 90 may be a substantially-flat, rigid, structural member. The plate has a front 110, a back 112, a top portion 114, and a bottom portion 116. The plate 90 may have a substantially rectangular shape with a length along a longitudinal axis and a height along a lateral axis and a thickness between the front 110 and the back 112. In one embodiment, the plate 90 may have a length of approximately forty-eight inches, a height of approximately six inches, and a thickness of approximately one-eighth of an inch. In one embodiment, the plate 90 may have a length in a range of approximately twenty-four inches to approximately forty-eight inches, a height in a range of approximately three inches to approximately eighteen inches, and a thickness of approximately one-eighth of an inch to approximately one-half of an inch. It will be understood that the shape and size of the plate 90 may be varied without substantially effecting the functionality of the hanger assembly 12.

In one embodiment, the plate 90 may have at least one sloped edge 118 extending at least partially along the bottom portion 116 between the front 110 and the back 112, configured to reduce resistance when sliding the plate 90 underneath the object 14.

In one embodiment, the plate 90 may be constructed of one or more of aluminum, fiberglass, plastic, or other light-weight material such that the plate remains substantially rigid as forces are applied to the plate 90, such as while the object 14 is being cleaned. In one embodiment, the plate 90 may include one or more structural supports to increase the rigidity of the plate 90, which may be positioned along the longitudinal axis. Nonexclusive examples of structural supports include ribbing, gussets, bends, offsets, beads, flared holes, or combinations thereof.

In one embodiment, the front 110 of the plate 90 may have texturing 120. The texturing 120 may provide traction to, and restrict movement of, the object 14 while attached to the plate 90. The texturing 120 may be formed on the front 110 of the plate 90. For example, the plate 90 may be a diamond plate aluminum with diamond texturing. In one embodiment, the one or more structural supports may be arranged to serve as the texturing 120. In one embodiment, the texturing 120 may be attached to, or processed into, the front 110 of the plate 90 by mechanical or chemical means, such as with perforation, adhesive backed texture strip(s), and anti-slip paint, for example.

Figure 9:
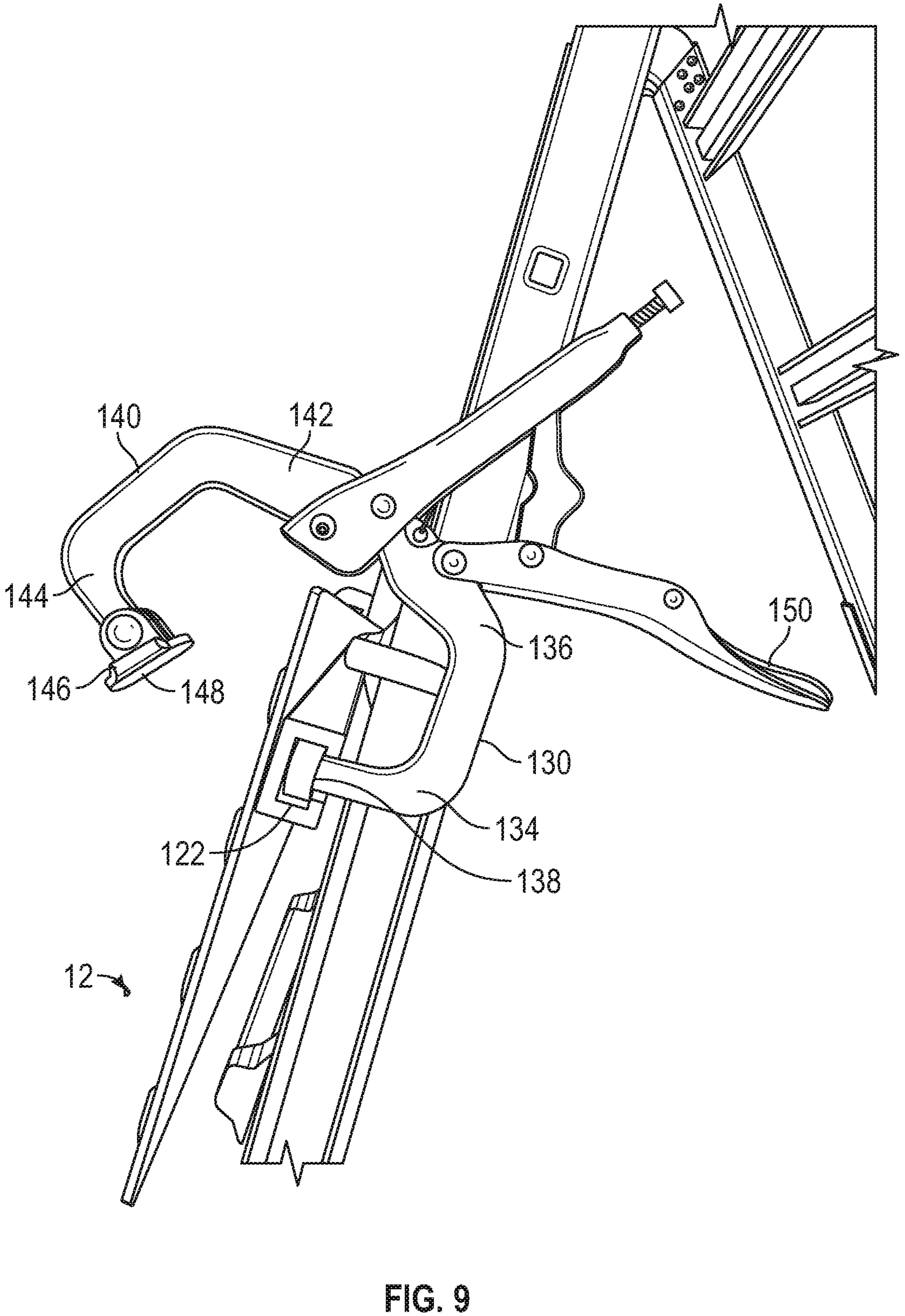
FIG. 9 is a partial side view of an exemplary clamp engaged with a track of the hanger assembly in accordance with the present disclosure.
Figure 10:
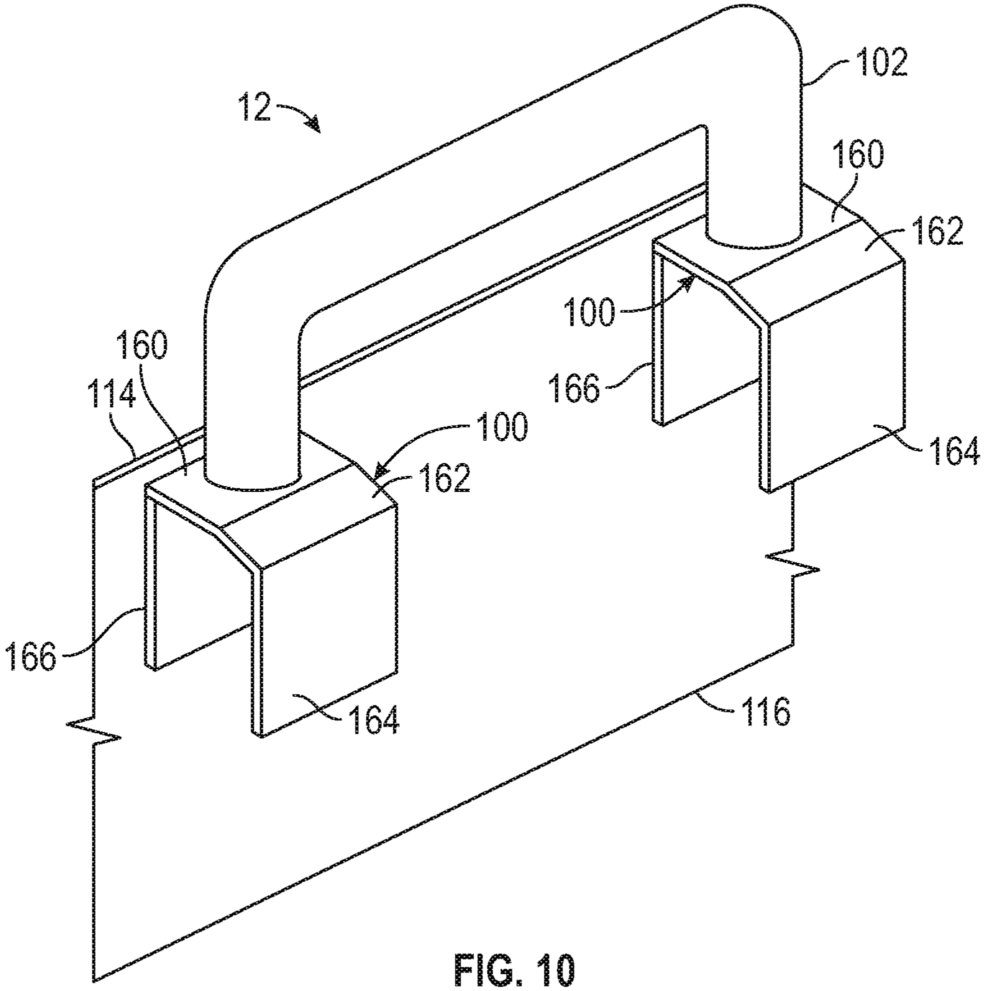
FIG. 10 is a partial back, perspective view of the exemplary hanger assembly of FIG. 6 in accordance with the present disclosure.
Figure 11:
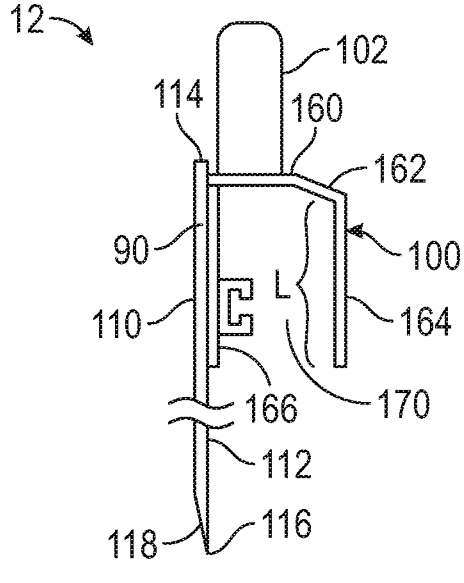
FIG. 11 is a partial side view of the exemplary hanger assembly of FIG. 6 in accordance with the present disclosure.

Turning now to FIG. 7-9, the first track 92 and the second track 96 may be connected to, or formed as part of, the back 112 of the plate 90. In one embodiment, the first track 92 and second track 96 may be formed as a feature of the plate 90, for example, by extracting material from the plate 90, by molding the plate to include the first track 92 and/or the second tracks 96, or a combination thereof. In one embodiment, the first track 92 and the second track 96 may be separate components attached to the back 112 of the plate 90.

The first track 92 may be substantially aligned with the second track 96 along the longitudinal axis of the plate 90. In one embodiment, the first track 92 may be spaced longitudinally from the second track 96 a distance greater than the width W1 of the first side rail assembly 30 at the first location where the first rung 34 attaches to the first side rail assembly 30, such that the first track 92 and the second track 96 are located outside and on opposite sides of the first side rail assembly 30 when the hanger assembly 12 is attached to the ladder 16, **16*a***.

The first track 92 and the second track 96 are configured to receive and moveably retain the first clamp 94 and the second clamp 98 respectively, while allowing the first clamp 94 and the second clamp 98 to be selectively positioned along the first track 92 and the second track 96, respectively. In one embodiment, each of first track 92 and the second track 96 may form an interior space 122 having a width and a height. In one embodiment, the interior space 122 having a shape of a "T", though it will be understood that other shapes may be utilized.

The first clamp 94 and the second clamp 98 each have a first arm 130 that has a distal end 134 and a proximal end 136. The distal end 134 is moveably engaged with the first track 92 and the second track 96 of the plate 90, such that the first clamp 94 is longitudinally adjustable along the first track 92 and the second clamp 98 is longitudinally adjustable along the second track 96. The proximal end 136 may extend from the distal end 134 to a position past and/or above the top portion 114 of the plate 90.

In one embodiment, the distal end 134 may have a track insert 138. The track insert 138 may have a cylindrical shape with a diameter that is larger than the distal end 134 of the first clamp 94 and the second clamp 98, but that is smaller than the width and the height of the interior space 122. The track insert 138 may be moveably engaged with the first track 92 and the second track 96 of the plate 90, such that the first clamp 94 is longitudinally adjustable along the first track 92 and the second clamp 98 is longitudinally adjustable along the second track 96. In one embodiment, the track insert 138 may permit rotation of the first clamp 94 and second clamp 98 about the top portion 114 of the plate 90, such as through an angle 139 (see FIG. 6).

The first clamp 94 and the second clamp 98 each has a second arm 140 that has a proximal end 142 and a distal end 144. The proximal end 142 of the second arm 140 is pivotally connected to the proximal end 136 of the first arm 130 such that the distal end 144 of the second arm 140 is rotatably adjustable in relation to the distal end 134 of the first arm 130. The distal end 144 of the second arm 140 extends from the proximal end 142 of the second arm 140 to a position in front of the front 110 of the plate 90. The first clamp 94 and the second clamp 98 each have an open position and a clamped position. In the open position, the distal end 144 of the second arm 140 is pivoted away from the front 110 of the plate 90 such that a gap is formed between the front 110 of the plate 90 and the distal end 144 of the second arm 140. In the clamped position, the distal end 144 of the second arm 140 is pivoted to the front 110 of the plate 90 such that the object 14 is clamped to the front 110 of the plate 90, between the distal end 144 of the second arm 140 and the front 110 of the plate 90.

In one embodiment, the distal end 144 of the second arm 140 may include a swivel jaw pad 146. The swivel jaw pad 146 may have a front surface 148. That swivel jaw pad 146 may be rotatably adjustable such that the front surface 148 may be adjusted to be substantially parallel with the front 110 of the plate when the first clamp 94 and/or the second clamp 98 are in the clamped position. In one embodiment, the front surface 148 of the swivel jaw pad 145 may have a surface area of approximately one square inch.

In one embodiment, the first clamp 94 and/or the second clamp 98 may be attached in other locations on the plate 90. In one embodiment, the first clamp 94 and/or the second clamp 98 may be stationary, without longitudinal adjustability. Additional or alternative components of the first clamp 94 and/or the second clamp 98 clamp are also contemplated.

In one embodiment, the first clamp 94 and the second clamp 98 may further comprise a locking mechanism 150 to lock the first clamp 94 and the second clamp 98 in the clamped position.

In one embodiment, the first clamp 94 and the second clamp 98 may be substantially similar to the locking C-clamp vise-grips made by Irwin Tools, headquartered in Huntersville, N.C.

In one embodiment, the hanger assembly 12 may include one or more additional clamp and/or one or more additional track.

As shown in FIGS. 7-14, in one embodiment, the one or more mounting hook 100 may be two or more mounting hooks 100. The mounting hooks 100 may be connected to the back 112 of the plate 90 and may be positioned between the first track 92 and the second track 96. The mounting hooks 100 each have a proximal portion 160 extending from the back 112 of the plate 90, an angled portion 162 extending from the proximal portion 160, and a distal portion 164 extending from the angled portion 162 toward the bottom portion 116 of the plate 90. It will be understood that the mounting hooks 100 may be connected to the back 112 of the plate 90 with well-known means, nonexclusive examples of which include a bracket 166 attached to the proximal portion 160 and the back 112, a weld, and an adhesive. In one embodiment, the mounting hooks 100 may be formed as an integral part of the plate 90.

In one embodiment, the proximal portion 160 of the mounting hook 100 may be substantially perpendicular to the back 112 of the plate 90. The angled portion 162 may form an obtuse angle with the proximal portion 160 and the distal portion 164 may form an obtuse angle with the angled portion 162. In one embodiment, the distal portion 164 may be substantially parallel to the back 112 of the plate 90. In one embodiment, the distal portion 164 may have a length L of at least approximately two inches.

Figure 13:
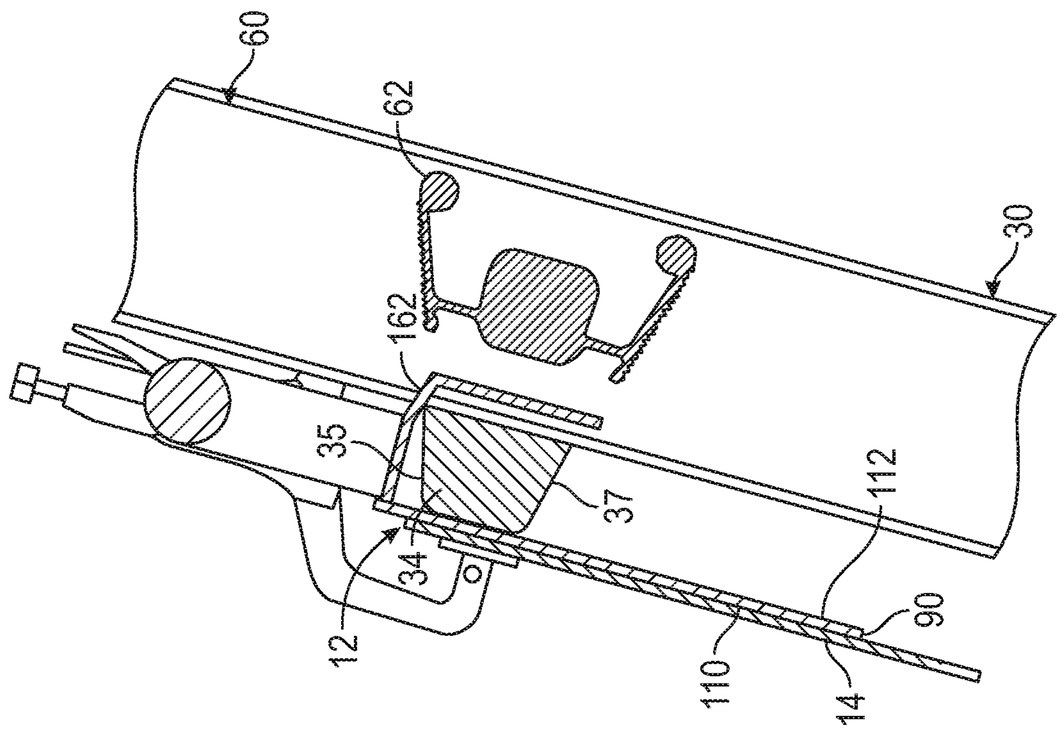
FIG. 13 is a partial side cross-sectional view of the exemplary ladder hanger system of FIG. 3 in accordance with the present disclosure.
Figure 12:
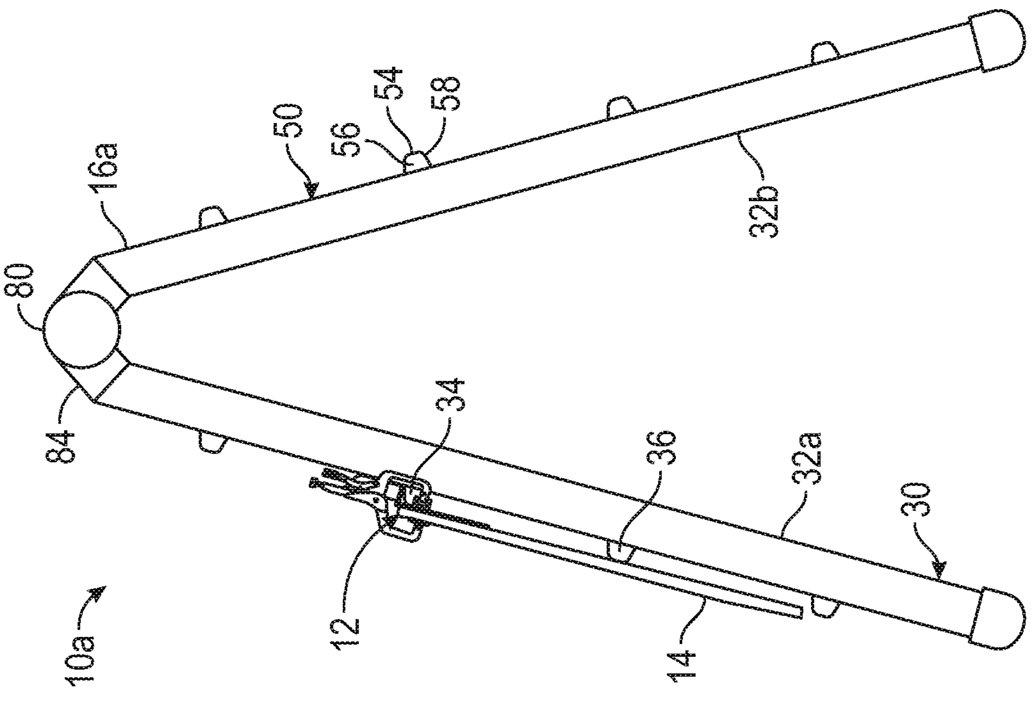
FIG. 12 is a side view of an exemplary ladder hanger system in accordance with the present disclosure.

The proximal portion 160, the angled portion 162, and the distal portion 164 of the mounting hook 100 cooperate to form a receiving space 170 for the first rung 34 or the second rung 36. The receiving space 170 may be larger than the diameter/width of the first rung 34 or the second rung 36. In one embodiment, the receiving space 170 may be substantially the same size as the diameter/width of the first rung 34 or the second rung 36. In one embodiment, as illustrated in FIG. 13, the receiving space 170 may be slightly larger than the diameter/width of the first rung 34 or the second rung 36, such that the distal portion 164 of the mounting hook 100 may be positioned between the first rung 34 and the one or more rungs 62 of the third side rail assembly 60, or between the second rung 36 and the one or more rungs 62 of the third side rail assembly 60.

Figure 15:
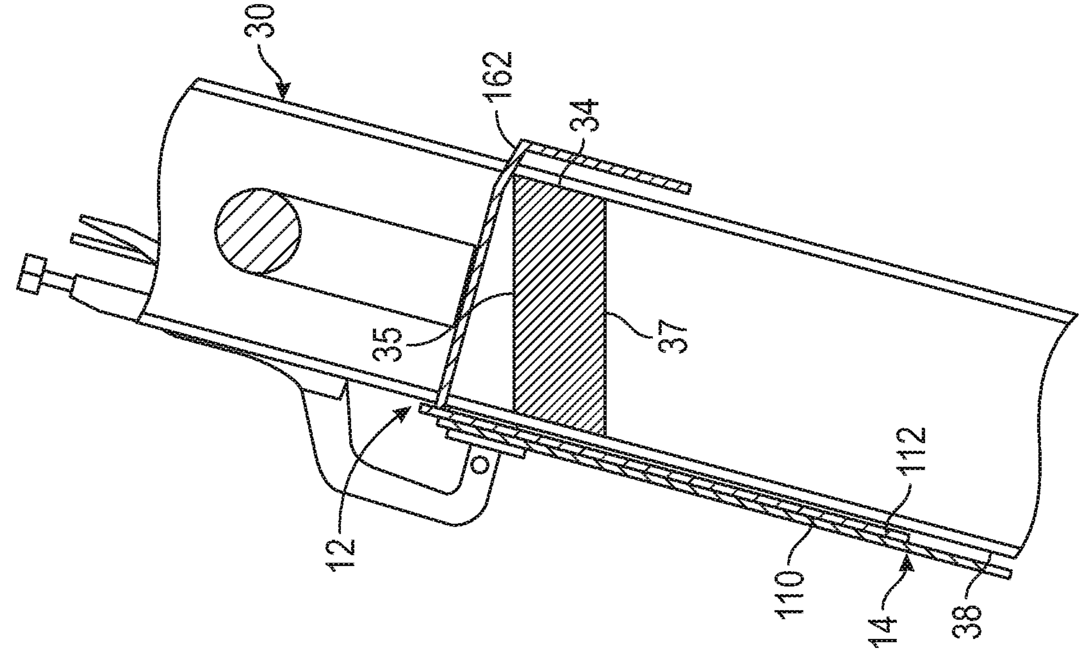
FIG. 15 is a partial side cross-sectional view of the exemplary ladder hanger system of FIG. 1 in accordance with the present disclosure.
Figure 14:
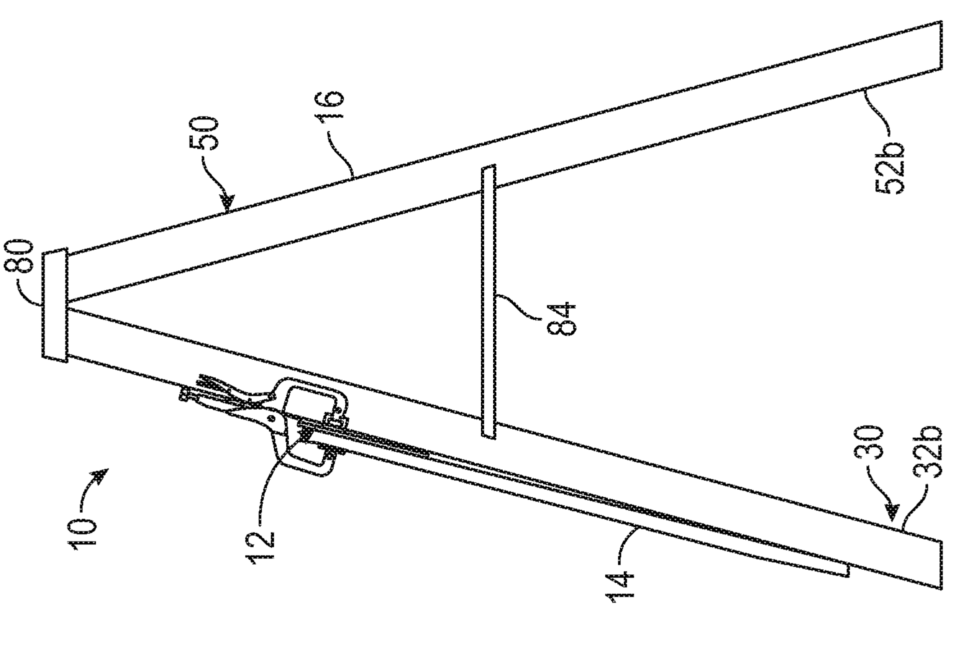
FIG. 14 is a side view of another exemplary ladder hanger system in accordance with the present disclosure.

In use, the mounting hooks 100 may be engaged with the first rung 34 or the second rung 36 and are positioned between the pair of first spaced apart rails 32*a*-32*b* of the first side rail assembly 30. In one embodiment, the mounting hooks 100 may engage the first rung 34 or the second rung 36 from above the first rung 34 or the second rung 36, such that the angled portion is in contact with the top 35 of the first rung 34 or the second rung 36. In one embodiment, the mounting hooks 100 may engage the first rung 34 or the second rung 36 from below the first rung 34 or the second rung 36, such that the angled portion is in contact with the bottom 37 of the first rung 34 or the second rung 36. In one embodiment, when the mounting hooks 100 are engaged with the first rung 34 or the second rung 36, the first rung 34 or the second rung 36 may be in contact with the back 112 of the plate 90 and the angled portions 162 of the mounting hooks 100 (see FIGS. 12-13). In one embodiment, when the mounting hooks 100 are engaged with the first rung 34 or the second rung 36, the front surface 38 of the first spaced apart rails 32*a*-32*b* may be in contact with the back 110 of the plate 90 while the first rung 34 or the second rung 36 may be in contact with the angled portions 162 of the mounting hooks 100 (see FIGS. 14-15).

In use, the length L of the distal portion 164 of the mounting hook 100 may prevent the hanger assembly 12 from unintentionally coming off of the ladder 16, 16*a*. For example, if the hanger assembly 12 becomes unbalanced along the longitudinal axis, the length L of the distal portion 164 of the mounting hook 100 maintains engagement of the hanger assembly 12 with the ladder 16, 16*a*.

Referring now to FIGS. 6-11, in one embodiment, the handle 102 may be connected to the plate 90. In one embodiment, the handle 102 may be substantially centered along longitudinal axis of the plate 90, so as to balance the weight of the hanger assembly 12. In one embodiment, the handle 102 may be made of one-inch diameter metal tubing. In one embodiment, the handle 102 may be constructed from the same material and/or have a substantially similar shape as the first rung 34 or the one or more rungs 62 of the third side rail assembly 60. In one embodiment, the handle 102 may be connected to the proximal portions 160 of the mounting hooks 100. It will be understood that the hanger assembly 12 may include different types of handles 102 and the handle 102 may be connected to the hanger assembly 12 in different locations. For example, in one embodiment, the handle 102 may be formed as an opening in the plate 90.

A method of use of the ladder hanger system 10 will now be described. In use, a user may position the ladder 16, 16*a* upright with the first rung 34 being substantially horizontal relative to the ground and the first side rail assembly 30 being either perpendicular to the ground or at an angle relative to the ground. If the ladder 16, 16*a* includes the locking mechanism 84, the user may engage the locking mechanism 84 to fix the ladder 16, 16*a* in the upright position. The user may grip the handle 102 and lift the hanger assembly 12 above the first rung 34 and position the hanger assembly 12 so that the mounting hooks 100 are located directly above the first rung 34 and centered between the first spaced apart rails 32*a*-32*b*. Next, the hanger assembly 12 may be lowered over the top 35 of the first rung 34, until the first rung 34 occupies at least a portion of the receiving space 170 of the mounting hooks 100 and the top 35 is in contact with at least the angled portions 162 of the mounting hooks 100. The back 110 of the plate 90 may engage with the first rung 34, the second rung 36, and/or the first spaced apart rails 32*a*-32*b*.

In one embodiment, the user may grip the handle 102 and lift the hanger assembly 12 below the first rung 34 and position the hanger assembly 12 so that the mounting hooks 100 are located directly below the first rung 34 and centered between the first spaced apart rails 32*a*-32*b*. Next, the hanger assembly 12 may be raised below the bottom 37 of the first rung 34, until the first rung 34 occupies at least a portion of the receiving space 170 of the mounting hooks 100 and the bottom 37 is in contact with at least the angled portions 162 of the mounting hooks 100. The back 110 of the plate 90 may engage with the first rung 34, the second rung 36, and/or the first spaced apart rails 32*a*-32*b*.

The user may adjust the first clamp 94 and the second clamp 98 to the open position. The user may move the first clamp 94 along the first track 92 and/or move the second clamp 98 along the second track 96, depending on the size of the object 14, so as to clamp the object 14 in a portion of the edges of the object 14. The user may attach the object 14 to the hanger assembly 12 by placing the object 14 against the front 110 of the plate 90 and adjusting the first clamp 94 and the second clamp 98 to the clamped position. The user may center the object 14 along the longitudinal axis of the plate 90, with the first clamp 94 clamping a first corner portion of the object 14 to the front 110 of the plate 90 and the second clamp 98 clamping a second, opposite, corner portion of the object 14 to the front 110 of the plate 90. The user may selectively lock the first clamp 94 and/or the second clamp 98 in the clamped configuration with the locking mechanism 150 for the first claim 94 and/or the second clamp 94.

The user may attach the object 14 to the hanger assembly 12 before or after attaching the hanger assembly 12 to the ladder 16, 16*a*. In one embodiment, the user may grasp the handle 102 of the hanger assembly 12 and move the sloped edge 118 of the plate 90 underneath at least one edge of the object 14 before adjusting the first clamp 94 and the second clamp 98 to the clamped position.

With the object 14 securely attached to the hanger assembly 12 and the hanger assembly 12 securely engaged with the ladder 16, 16*a*, the user may apply a pressurized fluid to wash the object 14. Nonexclusive examples of the pressurized fluid may include air, water, aqueous solutions, chemical solutions, or combinations thereof. The pressurized fluid may be applied within a range of pressures, such as, for example, the pressure may be in a range of approximately 20 psi to approximately 5,000 psi. It will be understood that the pressure of the pressurized fluid may be limited to minimize damage to the object 14 caused by the pressurized fluid. The pressurized fluid applied to the object 14 loosens dirt and debris associated with the object 14, and gravity causes the fluid to carry the loosened dirt and debris downward and away from the object 14. The object 14 may remain attached to the hanger assembly 12 for a predetermined period of time to allow the object 14 to air dry in order to avoid the growth of mold and mildew. Or the object 14 may be dried mechanically while attached to the hanger assembly 12.

In some embodiments, it may be desirable to ensure the object 14 is taut between the first clamp 94 and the second clamp 98, and forming a substantially flat area while the object 14 is attached to the hanger assembly 12, which may maximize the exposed surface area of the object 14 and promote flow of the pressurized fluid across and through the object 14. In some embodiments, the object 14 may extend beyond the bottom portion 116 of the plate 90. The second rung 36 and the first spaced apart rails 32*a*-32*b* of the first side rail assembly 30 may provide support for at least a portion of the object 14 that extends beyond the bottom portion 116 of the plate 90, which may further promote maintaining a substantially flat area of the object 14.

Figure 16:
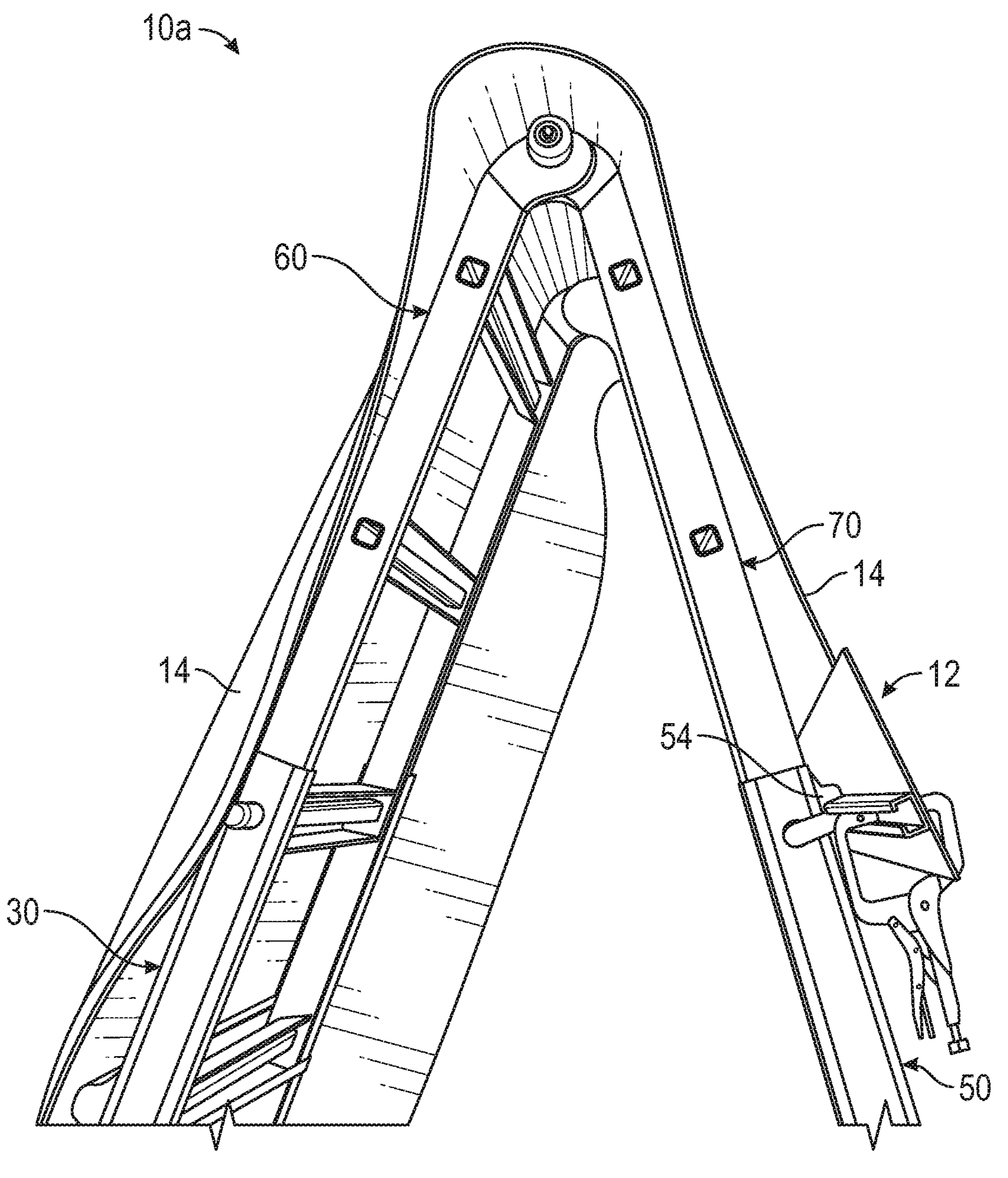
FIG. 16 is a partial side view of an exemplary ladder hanger system in use in accordance with the present disclosure.

In one embodiment, as shown in FIG. 16, the user may drape at least a portion of the object 14 over the one or more hinge 80 before attaching the hanger assembly 12 to the ladder 16, as shown in FIG. 16. For example, in one embodiment, the user may lift the hanger assembly 12 with the attached object 14 over the second and fourth side rail assembly 50, 70, allowing at least a portion of the object 14 to remain on the second and/or fourth side rail assembly 50, 70. The hanger assembly 12 may be lowered over the first and/or third side rail assembly 30, 60 before the hanger assembly 12 is engaged to the bottom 37 of the first rung 34 or second rung 36. In one embodiment, the user may lift the hanger assembly 12 with the attached object 14 over the first and third side rail assembly 30, 60 allowing at least a portion of the object 14 to remain on the first and/or third side rail assembly 30, 60. The hanger assembly 12 may be lowered over the second and fourth side rail assembly 50, 70 before the hanger assembly 12 is engaged to the bottom 58 of the one or more rung 54 of the second side rail assembly 50. The one or more rungs 54, 62, and 72 of the second, third, and forth side rail assemblies 50, 60, 70, respectively, may provide support for at least a portion of the object 14.

The user may release the object 14 from the hanger assembly 12 by adjusting the first clamp 94 and the second clamp 98 to the open position and/or and removing the hanger assembly 12 from the ladder 16, 16*a*.

In one embodiment, the hanger assembly 12 may be attached to a two-by-four wooden structure that is horizontally secured between two vertical studs at a construction location. It will be understood that the hanger assembly 12 may be attached to any type of ladder 16, 16*a* or similar structure having a rigid horizontal member substantially similar to the first rung 34.

In one embodiment, the hanger assembly 12 may be used at a construction site of a home or apartment complex with vertical studs (such as standard vertical studs that may be separated by approximately sixteen inches), such that the mounting hooks 100, the first track 92, and second track 96 are positioned between the vertical studs. The hanger assembly may be used to display informational documents at the construction site, such as building plans, blueprints, lists of building material, work schedules, and combinations thereof, for example.

CONCLUSION

Conventionally, it has been difficult to position an object, such as a rug, in a manner that allows the object to be adequately cleaned. In accordance with the present disclosure, a hanger assembly is configured to receive and suspend the object on a ladder.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method, comprising:

positioning a ladder in an upright position, the ladder comprising:

a first side rail assembly including a pair of first spaced apart rails and a first rung and a second rung extending across, and coupled to, the first spaced apart rails, the first side rail assembly having a first width across the pair of first spaced apart rails; and a second side rail assembly including a pair of second spaced apart rails, the second side rail assembly rotatably connected to the first side rail assembly;

mounting a hanger assembly to the first rung of the ladder, the hanging assembly comprising:

a plate having a front having a textured surface, a back, a top portion, a bottom portion, and a longitudinal axis;

a first track and a second track connected to the back of the plate, the first track substantially aligned with the second track along the longitudinal axis, the first track spaced longitudinally a second width from the second track, the second width a longer than the first width of the first side rail assembly;

a first clamp having:

a first arm having a distal end and a proximal end, the distal end moveably engaged with the first track such that the first clamp is longitudinally adjustable along the first track, and the proximal end extending from the distal end past the top portion of the plate; and a second arm having a proximal end and a distal end, the proximal end of the second arm pivotally connected to the proximal end of the first arm such that the distal end of the second arm is rotatably adjustable in relation to the distal end of the first arm, the distal end of the second arm extends from the proximal end of the second arm to a position in front of the front of the plate;

wherein the first clamp has an open position in which the distal end of the second arm is pivoted away from the front of the plate such that a gap is formed between the front of the plate and the distal end of the second arm; and wherein the first clamp has a clamped position in which the distal end of the second arm is pivoted to the front of the plate such that an object between the second arm and the front of the plate is clamped to the front of the plate;

a second clamp having:

a first arm having a distal end and a proximal end, the distal end moveably engaged with the second track such that the second clamp is longitudinally adjustable along the second track, and the proximal end extending from the distal end past the top portion of the plate; and a second arm having a proximal end and a distal end, the proximal end of the second arm pivotally connected to the proximal end of the first arm such that the distal end of the second arm is rotatably adjustable in relation to the distal end of the first arm, the distal end of the second arm extends from the proximal end of the second arm to a position in front of the front of the plate;

wherein the second clamp has an open position in which the distal end of the second arm is pivoted away from the front of the plate such that a gap is formed between the front of the plate and the distal end of the second arm; and wherein the second clamp has a clamped position in which the distal end of the second arm is pivoted to the front of the plate such that the object between the second arm and the front of the plate is clamped to the front of the plate; and two mounting hooks connected to the plate between the first track and the second track, the two mounting hooks each having a proximal portion connected to the back of the plate and substantially perpendicular to the back of the plate, an angled portion extending from the proximal portion and forming an obtuse angle with the proximal portion, and a distal portion extending from the angled portion and forming an obtuse angle with the angled portion, the distal portion substantially parallel to the back of the plate; wherein the proximal portion, the angled portion, and the distal portion cooperate to form a receiving space for the first rung;

wherein mounting the hanger assembly comprises positioning the two mounting hooks between the first spaced apart rails of the first side rail assembly and engaging the two mounting hooks with the first rung by inserting the first rung into the receiving space; and attaching the object to the hanger assembly by positioning a first portion of the object between the distal end of the second arm of the first clamp and the front of the plate and adjusting the first clamp to the clamped position, and positioning a second portion of the object between the distal end of the second arm of the second clamp and the front of the plate and adjusting the second clamp to the clamped position.

2. The method of claim 1, wherein when the ladder is in the upright position the first side rail assembly forms an acute angle with the second side rail assembly, the first rung is substantially horizontal relative to the ground, and the first side rail assembly is at least one of: perpendicular to the ground and at an angle relative to the ground.

3. The method of claim 1, wherein the object is a rug having a front and a back, and wherein the back of the rug is supported by at least one of the second rung and the pair of first spaced apart rails of the first side rail assembly.

4. The method of claim 1, wherein the object is fixed to the plate by the first clamp and the second clamp before the hanger assembly is engaged with the ladder, such that the object is taut and forms a substantially flat area.

5. The method of claim 1, further comprising:

cleaning the object by applying a pressurized fluid to the object after the object is attached to the hanger assembly and the hanger assembly is engaged with the ladder.

6. The method of claim 1, wherein the first rung occupies the receiving space and is in contact with the back of the plate and the angled portions of the two mounting hooks when the hanging assembly is engaged with the ladder.

7. The method of claim 1, wherein the first rung occupies the receiving space and the pair of first spaced apart rails is in contact with the back of the plate and the angled portions of the two mounting hooks is in contact with the first rung when the hanging assembly is engaged with the ladder.

8. The method of claim 1, wherein the hanger assembly further comprises a handle.

9. The method of claim 1, wherein the bottom portion of the plate has a sloped edge.

10. The method of claim 1, wherein the distal portion of each of the two mounting hooks extends from the angled portion a length of two or more inches.

11. The method of claim 1, wherein each of the first and second clamps further comprises a locking mechanism configured to fix the second arm in a position relative to the first arm.

12. The method of claim 1, wherein the ladder further comprises:

a third side rail assembly including a pair of third spaced apart rails mounted in a telescopic relation within the first side rail assembly, and including one or more rung extending across, and coupled to, the third spaced apart rails; and a fourth side rail assembly including a pair of fourth spaced apart rails mounted in a telescopic relation within the second side rail assembly, and including one or more rung extending across, and coupled to, the fourth spaced apart rails.

13. The method of claim 12, wherein the distal portions of the two mounting hooks are positioned between the first rung of the first side rail assembly and the one or more rung of the third side rail assembly.

* * * * *